United States Patent
De Los Reyes et al.

(10) Patent No.: US 9,386,114 B2
(45) Date of Patent: Jul. 5, 2016

(54) SYSTEMS AND METHODS FOR ACCESSING AN UPDATE SERVER

(75) Inventors: Andrew De Los Reyes, Belmont, CA (US); Darin S. Petkov, Zürich (CH)

(73) Assignee: Google Inc., Mountain View, CA (US)

( * ) Notice: Subject to any disclaimer, the term of this patent is extended or adjusted under 35 U.S.C. 154(b) by 174 days.

(21) Appl. No.: 13/349,471

(22) Filed: Jan. 12, 2012

(65) Prior Publication Data

US 2015/0207894 A1    Jul. 23, 2015

Related U.S. Application Data

(60) Provisional application No. 61/580,923, filed on Dec. 28, 2011.

(51) Int. Cl.
*H04L 29/08* (2006.01)
*G06F 9/44* (2006.01)
*G06F 9/445* (2006.01)

(52) U.S. Cl.
CPC *H04L 67/28* (2013.01); *G06F 8/00* (2013.01); *H04L 67/34* (2013.01); *G06F 8/65* (2013.01)

(58) Field of Classification Search
CPC ... H04L 29/08072; H04L 45/02; H04L 47/10; H04L 63/20; H04L 67/28; H04L 67/02; H04L 67/1002; H04L 63/0281; H04L 29/06027; H04L 12/2602; H04L 29/12509; G06Q 30/0257; H04W 80/04; G06F 21/57; G06F 8/65
USPC ......... 709/219, 240, 242, 218, 231, 224, 228, 709/239, 225, 203; 726/1, 12; 705/14.55; 370/328; 717/169, 173; 713/181
See application file for complete search history.

(56) References Cited

U.S. PATENT DOCUMENTS

| | | | |
|---|---|---|---|
| 6,691,112 B1 * | 2/2004 | Siegel et al. | |
| 6,772,225 B1 * | 8/2004 | Jennings, III et al. | 709/240 |
| 6,892,235 B1 * | 5/2005 | Daude | H04L 12/2602 709/224 |
| 7,330,880 B1 * | 2/2008 | English | 709/219 |
| 7,886,023 B1 * | 2/2011 | Johnson | 709/219 |
| 8,316,106 B2 * | 11/2012 | Hajiaghayi et al. | 709/219 |
| 8,543,826 B1 * | 9/2013 | Hutchison et al. | 713/181 |
| 2002/0046262 A1 * | 4/2002 | Heilig et al. | 709/219 |
| 2002/0198993 A1 * | 12/2002 | Cudd et al. | 709/225 |
| 2004/0003101 A1 * | 1/2004 | Roth et al. | 709/231 |

(Continued)

OTHER PUBLICATIONS

"EIGRP White Paper", Jun. 10, 2002, Cisco Systems, Inc., 16 pages total.*

*Primary Examiner* — Oleg Survillo
*Assistant Examiner* — Schquita Goodwin
(74) *Attorney, Agent, or Firm* — McDermott Will & Emery LLP

(57) ABSTRACT

Systems and methods for accessing an update server to receive one or more updates for data are provided. In some aspects, a system includes an auto-update module configured to determine whether to access the update server directly or by proxy. If the auto-update module determines to access the update server by proxy, the auto-update module is configured to: transmit a request to a proxy manager module for proxy server data that identifies one or more proxy servers; receive the proxy server data from the proxy manager module in response to the request; and access the update server based on the proxy server data to receive one or more updates for the data. The auto-update module is subject to fewer restrictions in modifying the data than is the proxy manager module.

21 Claims, 3 Drawing Sheets

(56) References Cited

U.S. PATENT DOCUMENTS

| | | | |
|---|---|---|---|
| 2005/0144616 A1* | 6/2005 | Hammond | G06F 8/65 717/173 |
| 2005/0204047 A1* | 9/2005 | Mitchell | H04L 67/02 709/228 |
| 2005/0283832 A1* | 12/2005 | Pragada et al. | 726/12 |
| 2006/0271705 A1* | 11/2006 | Garcia-Luna-Aceves | 709/242 |
| 2007/0199044 A1* | 8/2007 | Hughes | 726/1 |
| 2008/0281944 A1* | 11/2008 | Vorne et al. | 709/218 |
| 2009/0106394 A1* | 4/2009 | Lin | H04L 29/125 709/218 |
| 2009/0177843 A1* | 7/2009 | Wallach et al. | 711/131 |
| 2009/0259551 A1* | 10/2009 | Chenard et al. | 705/14.55 |
| 2010/0017500 A1* | 1/2010 | Lee | 709/219 |
| 2011/0173601 A1* | 7/2011 | de los Reyes | 717/169 |
| 2012/0089671 A1* | 4/2012 | Averbuj et al. | 709/203 |
| 2013/0061281 A1* | 3/2013 | Pao et al. | 726/1 |
| 2014/0033194 A1* | 1/2014 | Natchadalingam et al. | 717/173 |

* cited by examiner

US 9,386,114 B2

SYSTEMS AND METHODS FOR ACCESSING AN UPDATE SERVER

CROSS-REFERENCES TO RELATED APPLICATIONS

The present application claims the benefit of U.S. Provisional Patent Application Ser. No. 61/580,923, entitled "Systems and Methods for Accessing an Update Server," filed on Dec. 28, 2011, which is hereby incorporated by reference in its entirety for all purposes.

FIELD

The subject technology generally relates to data updates and, in particular, relates to systems and methods for accessing update servers.

BACKGROUND

An electronic device may connect to an update server in order to obtain updates for an operating system running on the electronic device. An auto-update module of the operating system may be used to establish a connection to the update server using various proxy servers. A proxy manager module of the operating system may be used to determine which proxy server to use. The proxy manager module may typically be integral with a core part of the operating system, and as a result, may be implemented with the least amount of restriction in accessing and/or modifying the operating system. In other words, as part of the core part of the operating system, the proxy manager module may be considered trustworthy, and have privileged permission to access and/or modify the operating system.

SUMMARY

According to various aspects of the subject technology, a system for accessing an update server to receive one or more updates for data is provided. The system comprises an auto-update module configured to determine whether to access the update server directly or by proxy. If the auto-update module determines to access the update server by proxy, the auto-update module is configured to: transmit a request to a proxy manager module for proxy server data that identifies one or more proxy servers; receive the proxy server data from the proxy manager module in response to the request; and access the update server based on the proxy server data to receive one or more updates for the data. The auto-update module is subject to fewer restrictions in modifying the data than is the proxy manager module.

According to various aspects of the subject technology, a computer-implemented method for accessing an update server to receive one or more updates for data is provided. The method comprises determining, by an auto-update module, whether to access the update server directly or by proxy. If the auto-update module determines to access the update server by proxy, the method further comprises: transmitting a request to a proxy manager module for proxy server data that identifies one or more proxy servers; receiving the proxy server data from the proxy manager module in response to the request; and accessing the update server via the identified one or more proxy servers to receive one or more updates for the data. If accessing the update server via one of the one or more proxy servers fails, another one of the one or more proxy servers is accessed. The auto-update module is subject to fewer restrictions in modifying the data than is the proxy manager module.

According to various aspects of the subject technology, a machine-readable medium encoded with executable instructions for accessing an update server to receive one or more updates for an operating system is provided. The instructions comprise code for determining, by an auto-update module, whether to access the update server directly or by proxy based on a predetermined total number of attempts at accessing the update server. The predetermined total number of attempts include a current attempt at accessing the update server and one or more previous attempts at accessing the update server. The instructions also comprise code for accessing the update server directly at least once out of the predetermined total number of attempts at accessing the update server. If the auto-update module determines to access the update server by proxy, the instructions further comprise code for: transmitting a request to a proxy manager module for proxy server data that identifies one or more proxy servers; receiving the proxy server data from the proxy manager module in response to the request; and accessing the update server via the identified one or more proxy servers to receive one or more updates for the operating system. The auto-update module is subject to fewer restrictions in modifying the operating system than is the proxy manager module. A web browser of the operating system comprises the proxy manager module.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
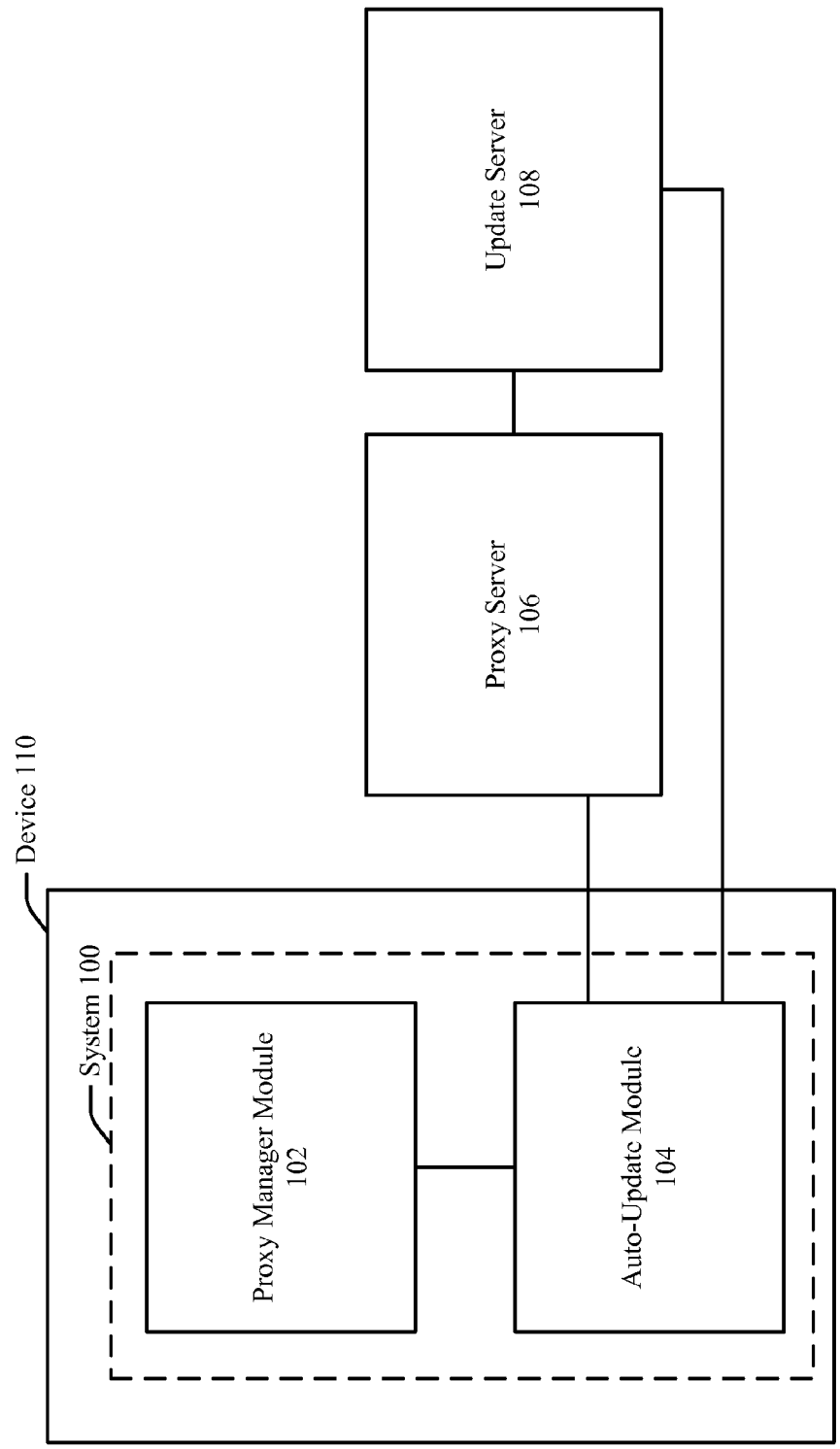
FIG. 1 illustrates an example of an electronic device connected to an update server directly and via a proxy server, in accordance with various aspects of the subject technology.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

According to various aspects of the subject technology, an auto-update module of an operating system may request from a proxy manager module a proxy server to use in order to access an update server. The proxy manager module may provide a list of proxy servers (or other suitable proxy server data) to the auto-update module in response to the request. It should be noted that the list is not limited to proxy servers, and that an entry in the list can simply instruct direct access to the update server. The auto-update module may access the update server via a selected entry (e.g., proxy server) in the list.

In selecting one of the proxy servers, the auto-update module may attempt to access the update server via the first proxy server in the list. If that proxy server fails (e.g., through connection failure, timeout, the determination that the proxy server contains erroneous information, and/or the determination that information obtained using this proxy server provides erroneous information), the auto-update module may iterate through subsequent proxy servers in the list until a successful connection occurs. In some aspects, if the attempt to access the update server via the proxy servers in the list fails (e.g., the list does not contain an entry for the update server and/or the auto-update module's request times out), the auto-update module may attempt to access the update server directly.

The auto-update module may be integral with a core part of the operating system, and as a result, may be implemented with the least amount of restriction in accessing and/or modifying the operating system. In other words, as part of the core part of the operating system, the auto-update module may be considered trustworthy, and have privileged permission to access and/or modify the operating system. The proxy manager module may typically be integral with the core part of the operating system as well. However, because determining which proxy server to use may be a complex and time-consuming task, it may be desirable to separate the proxy manager module from the core part of the operating system, which may also mean reducing the proxy manager module's permission to access and/or modify the operating system. For example, the proxy manager module may be made a part of a web browser of the operating system. Because the web browser is subject to more restrictions in accessing and/or modifying the operating system than is the auto-update module, the web browser (and the proxy manager module) may be considered less trustworthy than the auto-update module.

One challenge with having the proxy manager module as part of the web browser is that if the web browser is compromised as a result of malware, then the list of proxy servers provided by the proxy manager module may not be reliable. This may cause the auto-update module to be directed to a faulty update server, and because the auto-update module may have privileged permission to access and/or modify the operating system, the auto-update module may apply faulty updates or other malware to the operating system received from the faulty update server. To mitigate this problem, aspects of the subject technology provide a method to access the actual update server directly without having to use a proxy server. According to certain aspects, the auto-update module may be configured to periodically access the update server directly based on a predetermined total number of attempts at accessing the update server. For example, the auto-update module may attempt to access the update server directly once out of every twenty times that the auto-update module attempts to access the update server. The other nineteen times, for example, may be attempts to access the update server via the proxy server as determined by the proxy server module.

FIG. 1 illustrates an example of electronic device 110 connected to update server 108 directly and via proxy server 106, in accordance with various aspects of the subject technology. Electronic device 110 may be a desktop computer, a laptop computer, a notebook, a mobile phone, a tablet, or any other suitable electronic device. Electronic device 110 comprises system 100, which may access update server 108 to receive one or more updates for an operating system running on electronic device 110. System 100 comprises proxy manager module 102 and auto-update module 104. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Proxy manager module 102 may generate and/or maintain proxy server data that identifies one or more proxy servers. For example, proxy manager module 102 may generate a list of which proxy servers to use to connect electronic device 110 to update server 108. The proxy server data may comprise the list of the proxy servers, a protocol type associated with each of the proxy servers, and/or authentication information (e.g., username and/or password) associated with each of the proxy servers. Auto-update module 104 may receive the proxy server data from proxy manager module 102, and access update server 108 either directly or by proxy based on the proxy server data. As shown in FIG. 1, auto-update module 104 can be connected directly to update server 108 or via proxy server 106. A web browser of the operating system running on electronic device 110 may comprise proxy manager module 102. In contrast, auto-update module 104 may be integral with a core part of the operating system. In this regard, the web browser, including proxy manager module 102, may be subject to more restrictions in accessing and/or modifying the operating system than is auto-update module 104. These restrictions, for example, may include write and/or read prohibitions.

Figure 2:
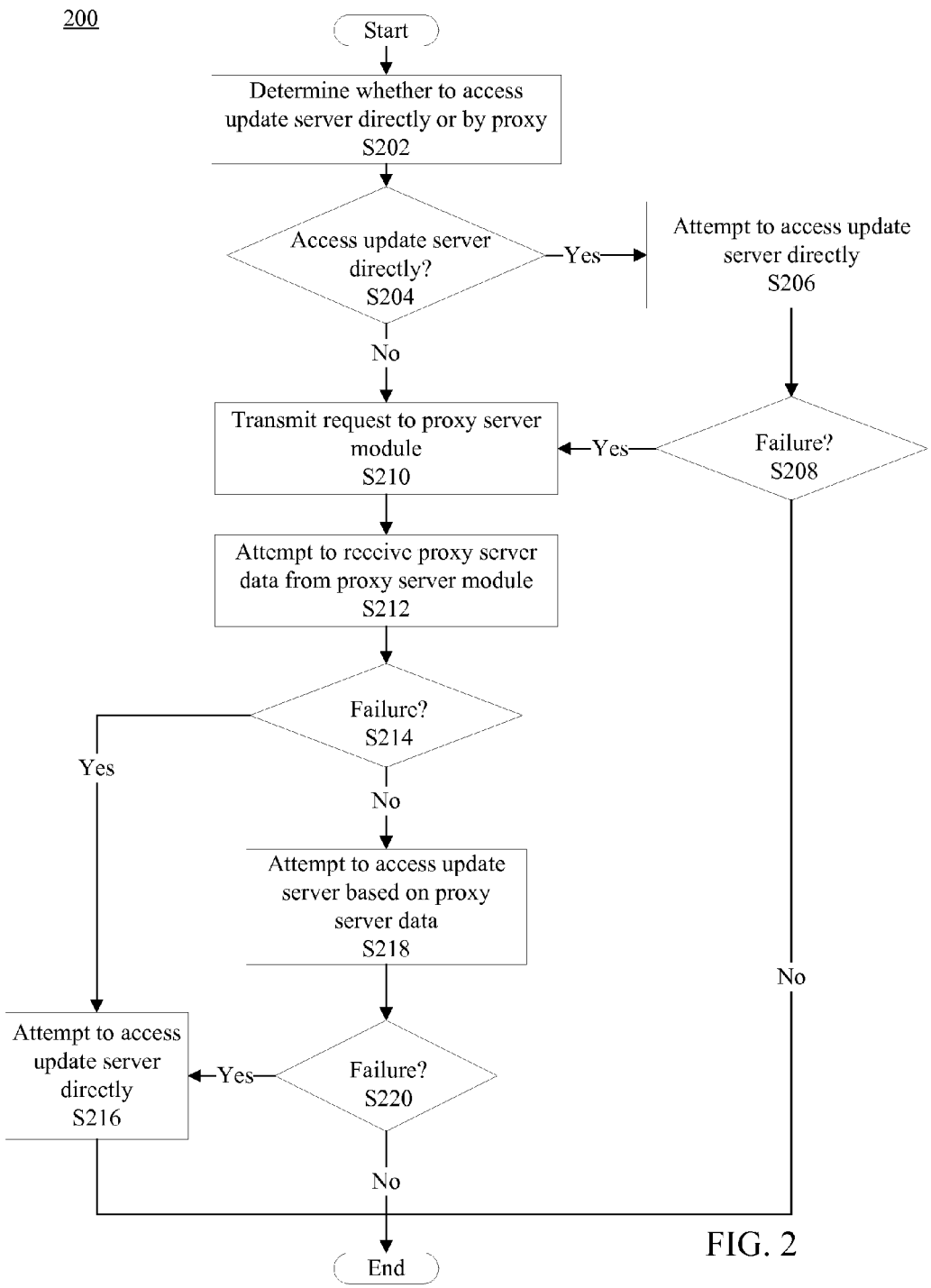
FIG. 2 illustrates an example of a method for accessing an update server to receive one or more updates for an operating system, in accordance with various aspects of the subject technology.

FIG. 2 illustrates an example of method 200 for accessing an update server to receive one or more updates for an operating system, in accordance with various aspects of the subject technology. Method 200, for example, may be implemented by system 100 to access update server 108 to receive the one or more updates. Although described with reference to system 100, method 200 is not limited thereto, and can be implemented by other systems and configurations. Furthermore, although method 200 and system 100 are described with respect to accessing the update server to receive one or more updates for the operating system, method 200 and system 100 may also be used to access the update server to receive one or more updates for other data on electronic device 110. According to step S202, auto-update module 104 may determine whether to access update server 108 directly or by proxy (e.g., via proxy server 106). In some aspects, auto-update module 104 may determine whether to access update server 108 directly or by proxy based on a predetermined total number of attempts at accessing update server 108. The predetermined total number of attempts may include a current attempt at accessing update server 108 and one or more previous attempts at accessing update server 108. According to certain aspects, auto-update module 104 may attempt to access update server 108 directly at least once out of the predetermined total number of attempts at accessing update server 108. For example, auto-update module 104 may access update server 108 directly if the current attempt at accessing update server 108 is the $N^{th}$ attempt at accessing update server 108 out of the predetermined total number of attempts. N may be a positive integer less than or equal to the predetermined total number of attempts. N may be predetermined or randomly generated.

In some aspects, auto-update module 104 may determine whether to access update server 108 directly or by proxy in another manner. For example, auto-update module 104 may determine whether to access update server 108 directly or by proxy based on a random probability. For example, auto-update module 104 may determine to access update server 108 directly based on a 25% chance, while auto-update module 104 may determine to access update server 108 by proxy based on a 75% chance. Thus, each time auto-update module 104 determines whether to access update server 108 directly or by proxy, either the direct approach or the proxy approach may have a chance of being used to access update server 108. While the 25% chance is described for the direct approach, other suitable probabilities greater than or less than the 25% chance may be used. Similarly, while the 75% chance is described for the proxy approach, other suitable probabilities greater than or less than the 75% chance may be used.

According to steps S204 and S206, if auto-update module 104 determines to access update server 108 directly (e.g., the current attempt is the $N^{th}$ attempt or the direct approach is selected based on the random probability), then auto-update module 104 may attempt to access update server 108 directly. According to steps S208 and S210, if accessing update server 108 directly fails, then auto-update module may attempt to access update server 108 by proxy. However, according to certain aspects, method 200 may also terminate without attempting to access update server 108 by proxy if accessing update server 108 directly fails.

Auto-update module 104 may also attempt to access update server 108 by proxy if the current attempt at accessing the update server is not the $N^{th}$ attempt at accessing the update server out of the predetermined total number of attempts, or if the proxy approach is selected based on the random probability. According to step S210, if auto-update module 104 determines to access update server 108 by proxy, auto-update module 104 may transmit a request to proxy manager module 102 for proxy server data that identifies one or more proxy servers to use to connect to update server 108, such as via proxy server 106. The request may comprise a uniform resource locator (URL) of update server 108. The proxy server data, for example, may comprise a list of the one or more proxy servers. According to step S212, auto-update module 104 may attempt to receive the proxy server data from proxy manager module 102 in response to the request. However, according to steps S214 and S216, if receiving the proxy server data fails (e.g., a time out occurs), auto-update module 104 may attempt to access update server 108 directly (assuming that accessing update server 108 directly was not previously attempted in step S206).

On the other hand, if receiving the proxy server data is successful, then auto-update module 104 may attempt to access update server 108 based on the proxy server data in order to receive one or more updates for the operating system, according to step S218. For example, auto-update module 104 is configured to access update server 108 via the identified one or more proxy servers from the proxy server data. This proxy server data may be a list of the one or more proxy servers that may be used to connect electronic device 110 to update server 108. Auto-update module 104 may attempt to access update server 108 using a particular one of the proxy servers identified in the list, and if accessing update server 108 using this particular one of the proxy servers fails (e.g., through connection failure, timeout, the determination that the proxy server contains erroneous information, and/or the determination that information obtained using this proxy server provides erroneous information), then auto-update module 104 may attempt to access update server 108 using another one of the proxy servers identified in the list. Auto-update module 104 may iterate through the one or more proxy servers in the list until a successful proxy server (e.g., proxy server 106) is found that provides a connection to update server 108. In this regard, auto-update module 104 may receive the one or more updates from update server 108 using this connection.

According to steps S216 and S220, if accessing update server 108 based on the proxy server data fails (e.g., none of the proxy servers in the list provided a successful connection to update server 108), auto-update module 104 may attempt to access update server 108 directly (assuming that accessing update server 108 directly was not previously attempted in step S206). If accessing update server 108 directly fails as well, then method 200 may be implemented at a later time in an attempt to access update server 108 again.

Figure 3:
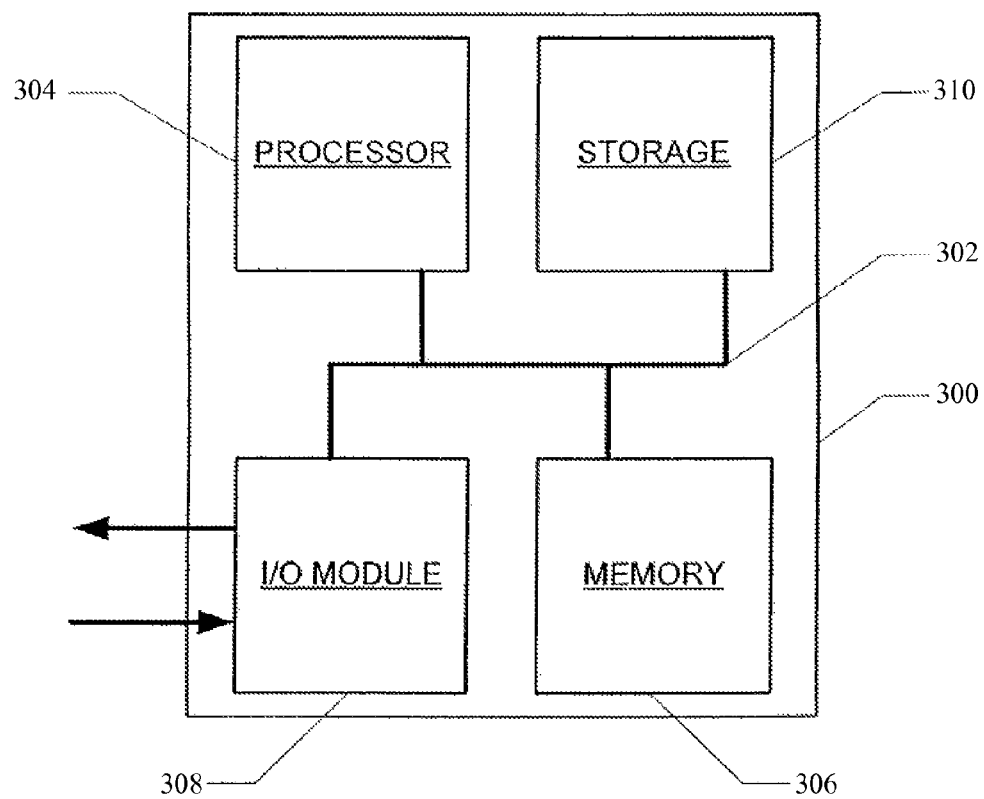
FIG. 3 is a block diagram illustrating components of a controller, in accordance with various aspects of the subject technology.

FIG. 3 is a block diagram illustrating components of controller 300, in accordance with various aspects of the subject technology. Controller 300 comprises processor module 304, storage module 310, input/output (I/O) module 308, memory module 306, and bus 302. Bus 302 may be any suitable communication mechanism for communicating information. Processor module 304, storage module 310, I/O module 308, and memory module 306 are coupled with bus 302 for communicating information between any of the modules of controller 300 and/or information between any module of controller 300 and a device external to controller 300. For example, information communicated between any of the modules of controller 300 may include instructions and/or data. In some aspects, bus 302 may be a universal serial bus. In some aspects, bus 302 may provide Ethernet connectivity.

In some aspects, processor module 304 may comprise one or more processors, where each processor may perform different functions or execute different instructions and/or processes. For example, one or more processors may execute instructions for accessing an update server to receive one or more updates for an operating system and one or more processors may execute instructions for input/output functions.

Memory module 306 may be random access memory ("RAM") or other dynamic storage devices for storing information and instructions to be executed by processor module 304. Memory module 306 may also be used for storing temporary variables or other intermediate information during execution of instructions by processor 304. In some aspects, memory module 306 may comprise battery-powered static RAM, which stores information without requiring power to maintain the stored information. Storage module 310 may be a magnetic disk or optical disk and may also store information and instructions. In some aspects, storage module 310 may comprise hard disk storage or electronic memory storage (e.g., flash memory). In some aspects, memory module 306 and storage module 310 are both a machine-readable medium.

Controller 300 is coupled via I/O module 308 to a user interface for providing information to and receiving information from an operator of system 100. For example, the user interface may be a cathode ray tube ("CRT") or LCD monitor for displaying information to an operator. The user interface may also include, for example, a keyboard or a mouse coupled to controller 300 via I/O module 308 for communicating information and command selections to processor module 304.

According to various aspects of the subject disclosure, methods described herein are executed by controller 300. Specifically, processor module 304 executes one or more sequences of instructions contained in memory module 306 and/or storage module 310. In one example, instructions may be read into memory module 306 from another machine-readable medium, such as storage module 310. In another example, instructions may be read directly into memory module 306 from I/O module 308, for example from an operator of system 100 via the user interface. Execution of the sequences of instructions contained in memory module 306 and/or storage module 310 causes processor module 304 to perform methods to access an update server to receive one or more updates for an operating system. For example, a computational algorithm for accessing an update server to receive one or more updates for an operating system may be stored in memory module 306 and/or storage module 310 as one or more sequences of instructions. Information such as the request, the proxy server data, the one or more updates, the restrictions, the predetermined total number of attempts, and/or other suitable information may be communicated from processor module 304 to memory module 306 and/or storage module 310 via bus 302 for storage. In some aspects, the information may be communicated from processor module 304, memory module 306, and/or storage module 310 to I/O module 308 via bus 302. The information may then be communicated from I/O module 308 to an operator of system 100 via the user interface.

One or more processors in a multi-processing arrangement may also be employed to execute the sequences of instructions contained in memory module 306 and/or storage module 310. In some aspects, hard-wired circuitry may be used in place of or in combination with software instructions to implement various aspects of the subject disclosure. Thus, aspects of the subject disclosure are not limited to any specific combination of hardware circuitry and software. Although the foregoing description of controller 300 describes an operator and a user interface, the update server may be accessed automatically without an operator and/or user interface.

The term "machine-readable medium," or "computer-readable medium," as used herein, refers to any medium that participates in providing instructions to processor module 304 for execution. Such a medium may take many forms, including, but not limited to, non-volatile media and volatile media. Non-volatile media include, for example, optical or magnetic disks, such as storage module 310. Volatile media include dynamic memory, such as memory module 306. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Illustration of Method/System/Machine-Readable Medium for Accessing an Update Server to Receive One or More Updates for Data (Described as Clauses)

The subject technology is illustrated, for example, according to various aspects described below. Various examples of aspects of the subject technology are described as numbered clauses (1, 2, 3, etc.) for convenience. These are provided as examples, and do not limit the subject technology. It is noted that the dependent clauses may be placed into a respective independent clause (e.g., clause 1, 17, or 20).

1. A system for accessing an update server to receive one or more updates for data, the system comprising:
an auto-update module configured to determine whether to access the update server directly or by proxy,
wherein if the auto-update module determines to access the update server by proxy, the auto-update module is configured to:
transmit a request to a proxy manager module for proxy server data that identifies one or more proxy servers;
receive the proxy server data from the proxy manager module in response to the request; and
access the update server based on the proxy server data to receive one or more updates for the data,
wherein the auto-update module is subject to fewer restrictions in modifying the data than is the proxy manager module.

2. The system of clause 1, wherein the auto-update module is configured to determine whether to access the update server directly or by proxy based on a predetermined total number of attempts at accessing the update server, the predetermined total number of attempts including a current attempt at accessing the update server and one or more previous attempts at accessing the update server.

3. The system of clause 2, wherein the auto-update module is configured to access the update server directly at least once out of the predetermined total number of attempts at accessing the update server.

4. The system of clause 2, wherein the auto-update module is configured to access the update server directly if the current attempt at accessing the update server is the $N^{th}$ attempt at accessing the update server out of the predetermined total number of attempts at accessing the update server, and wherein N is a positive integer less than or equal to the predetermined total number of attempts.

5. The system of clause 1, wherein the auto-update module is configured to determine whether to access the update server directly or by proxy based on a random probability.

6. The system of clause 1, wherein the auto-update module is configured to access the update server by proxy if accessing the update server directly fails.

7. The system of clause 1, wherein the proxy manager module is configured to generate the proxy server data.

8. The system of clause 1, wherein the proxy server data comprises at least one of a list of the one or more proxy servers, a protocol type associated with each of the one or more proxy servers, and authentication information associated with each of the one or more proxy servers.

9. The system of clause 1, wherein the request comprises a uniform resource locator (URL) of the update server.

10. The system of clause 1, wherein the auto-update module is configured to access the update server directly if receiving the proxy server data from the proxy manager module fails.

11. The system of clause 1, wherein if the auto-update module determines to access the update server by proxy, the auto-update module is configured to access the update server via the identified one or more proxy servers.

12. The system of clause 11, wherein if accessing the update server via one of the one or more proxy servers fails, the auto-update module is configured to access the update server via another one of the one or more proxy servers.

13. The system of clause 1, wherein the auto-update module is configured to access the update server directly if accessing the update server based on the proxy server data fails.

14. The system of clause 1, wherein the data comprises an operating system.

15. The system of clause 14, wherein a web browser of the operating system comprises the proxy manager module.

16. The system of clause 15, wherein the web browser is subject to more restrictions in modifying the operating system than is the auto-update module.

17. A computer-implemented method for accessing an update server to receive one or more updates for data, the method comprising:
  determining, by an auto-update module, whether to access the update server directly or by proxy,
  wherein if the auto-update module determines to access the update server by proxy, the method further comprises:
    transmitting a request to a proxy manager module for proxy server data that identifies one or more proxy servers;
    receiving the proxy server data from the proxy manager module in response to the request; and
    accessing, by the auto-update module, the update server via the identified one or more proxy servers to receive one or more updates for the data,
  wherein if accessing the update server via one of the one or more proxy servers fails, another one of the one or more proxy servers is accessed, and
  wherein the auto-update module is subject to fewer restrictions in modifying the data than is the proxy manager module.

18. The method of clause 17, wherein the auto-update module determines whether to access the update server directly or by proxy based on a predetermined total number of attempts at accessing the update server, the predetermined total number of attempts including a current attempt at accessing the update server and one or more previous attempts at accessing the update server.

19. The method of clause 18, further comprising accessing the update server directly at least once out of the predetermined total number of attempts at accessing the update server.

20. A machine-readable medium encoded with executable instructions for accessing an update server to receive one or more updates for an operating system, the instructions comprising code for:
  determining, by an auto-update module, whether to access the update server directly or by proxy based on a predetermined total number of attempts at accessing the update server, the predetermined total number of attempts including a current attempt at accessing the update server and one or more previous attempts at accessing the update server; and
  accessing, by the auto-update module, the update server directly at least once out of the predetermined total number of attempts at accessing the update server,
  wherein if the auto-update module determines to access the update server by proxy, the instructions further comprise code for:
    transmitting a request to a proxy manager module for proxy server data that identifies one or more proxy servers;
    receiving the proxy server data from the proxy manager module in response to the request; and
    accessing, by the auto-update module, the update server via the identified one or more proxy servers to receive one or more updates for the operating system,
  wherein the auto-update module is subject to fewer restrictions in modifying the operating system than is the proxy manager module, and
  wherein a web browser of the operating system comprises the proxy manager module.

21. The machine-readable medium of clause 20, wherein the auto-update module accesses the update server directly if the current attempt at accessing the update server is the $N^{th}$ attempt at accessing the update server out of the predetermined total number of attempts at accessing the update server, and wherein N is a positive integer less than or equal to the predetermined total number of attempts.

22. The machine-readable medium of clause 21, wherein the auto-update module is accesses the update server by proxy if the current attempt at accessing the update server is not the $N^{th}$ attempt at accessing the update server out of the predetermined total number of attempts at accessing the update server.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A computer-implemented method for accessing an update server to receive one or more updates for data on an electronic device, the method comprising:
    determining, by an auto-update module, whether to use a proxy server to initiate access to the update server, or to initiate direct access to the update server, wherein the auto-update module is configured to initiate access to the update server via the proxy server if accessing the update server directly fails, and
    wherein when the auto-update module determines to use the proxy server to initiate access to the update server, the method further comprises:
    transmitting a request to a proxy manager module for proxy server information, the proxy server information identifying one or more proxy servers providing access to the update server;
    receiving the proxy server information from the proxy manager module in response to the request; and
    receiving the update for the data on the electronic device from the update server via one of the one or more proxy servers,
    wherein if accessing the update server via the one of the proxy server fails, another one of the identified one or more proxy servers is accessed.

2. The method of claim 1, wherein the auto-update module determines whether to initiate access to the update server directly or using a proxy server based on a predetermined total number of attempts at accessing the update server, the predetermined total number of attempts including a current attempt at accessing the update server and one or more previous attempts at accessing the update server.

3. The method of claim 2, further comprising initiating accessing the update server directly at least once out of the predetermined total number of attempts at accessing the update server.

4. An electronic device for accessing an update server to receive one or more updates for data on the electronic device, the electronic device comprising:
    one or more processors; and
    an auto-update module configured to determine, by the one or more processors, whether to use a proxy server to initiate access to the update server, or to initiate direct access to the update server, wherein the auto-update module is configured to initiate access to the update server via a proxy server if accessing the update server directly fails, and
    wherein when the auto-update module determines to use the proxy server to initiate access to the update server, the auto-update module is configured to:
    transmit a request to a proxy manager module for proxy server information, the proxy server information identifying one or more proxy servers providing access to the update server;
    receive the proxy server information from the proxy manager module in response to the request; and
    receive the one or more updates for the data on the electronic device from the update server via at least one of the one or more proxy servers.

5. The electronic device of claim 4, wherein the auto-update module is configured to determine whether to use a proxy server based on a predetermined total number of attempts at accessing the update server, the predetermined total number of attempts including a current attempt at accessing the update server and one or more previous attempts at accessing the update server.

6. The electronic device of claim 5, wherein the auto-update module is configured to access the update server directly at least once out of the predetermined total number of attempts at accessing the update server.

7. The electronic device of claim 5, wherein the auto-update module is configured to initiate access to the update server directly if the current attempt at accessing the update server is the Nth attempt at accessing the update server out of the predetermined total number of attempts at accessing the update server, and wherein N is a positive integer less than or equal to the predetermined total number of attempts.

8. The electronic device of claim 4, wherein the auto-update module is configured to determine whether to use a proxy server based on a random probability.

9. The electronic device of claim 4, wherein the proxy manage module is configured to generate the proxy server information.

10. The electronic device of claim 4, wherein the proxy server information comprises at least one of a list of the one or more proxy servers, a protocol type associated with each of the one or more proxy servers, and authentication information associated with each of the one or more proxy servers.

11. The electronic device of claim 4, wherein the request comprises a uniform resource locator (URL) of the update server.

12. The electronic device of claim 4, wherein the auto-update module is configured to initiate access to the update server directly if receiving the proxy server information from the proxy manager module fails.

13. The electronic device of claim 4, wherein if the auto-update module determines to initiate access to the update server via a proxy server, the auto-update module is configured to initiate access to the update server via the identified one or more proxy servers.

14. The electronic device of claim 13, wherein if accessing the update server via one of the one or more proxy servers fails, the auto-update module is configured to initiate access to the update server via another one of the one or more proxy servers.

15. The electronic device of claim 4, wherein the auto-update module is configured to initiate access to the update server directly if accessing the update server based on the proxy server information fails.

16. The electronic device of claim 4, wherein the data comprises an operating system.

17. The electronic device of claim 16, wherein a web browser of the operating system comprises the proxy manager module.

18. The electronic device of claim 17, wherein the web browser is subject to more restrictions in modifying the operating system than is the auto-update module.

19. A machine-readable, non-transitory, storage medium encoded with executable instructions for accessing an update server to receive one or more updates for an operating system on an electronic device, the instructions comprising code for:

determining, by an auto-update module, whether to use a proxy server to initiate access to the update server, or to initiate direct access to the update server, to receive from the update server an update for the operating system on the electronic device based on a predetermined total number of attempts at accessing the update server, the predetermined total number of attempts including a current attempt at accessing the update server and one or more previous attempts at accessing the update server; and accessing, by the auto-update module, the update server directly at least once out of the predetermined total number of attempts at accessing the update server, wherein when the auto-update module determines to use the proxy server to initiate access to the update server via the proxy server, the instructions further comprise code for:

transmitting a request to a proxy manager module for proxy server information, the proxy server information identifying one or more proxy servers providing access to the update server;

receiving the proxy server information from the proxy manager module in response to the request; and receiving the update for the operating system on the electronic device from the update server via the identified one or more proxy servers, wherein a web browser of the operating system comprises the proxy manager module.

20. The machine-readable, non-transitory, storage medium of claim 19, wherein the instructions comprise code for, initiating accessing, by the auto-update module, the update server directly if the current attempt at accessing the update server is the Nth attempt at accessing the update server out of the predetermined total number of attempts at accessing the update serer, and wherein N is a positive integer less than or equal to the predetermined total number of attempts.

21. The machine-readable, non-transitory, storage medium of claim 19, wherein the instructions comprise code for, initiating accessing, by the auto-update module, the update server via a proxy server if the current attempt at accessing the update server is not the Nth attempt at accessing the update server out of the predetermined total number of attempts at accessing the update server.

* * * * *